United States Patent [19]

Williams

[11] 4,114,327
[45] Sep. 19, 1978

[54] LIGHT FIXTURE SUPPORT

[76] Inventor: Arthur C. Williams, 21711 Glenbranch, Spring, Tex. 77373

[21] Appl. No.: 796,725

[22] Filed: May 13, 1977

[51] Int. Cl.² .................... H05B 33/02; E04F 19/00
[52] U.S. Cl. .................................. 52/28; 52/39; 52/488; 52/664; 52/669; 52/696; 248/214; 248/343; 403/241; 403/247; 403/353
[58] Field of Search ............. 52/28, 317, 664, 669, 52/696, 39, 488; 248/343, 342, 214, 215; 403/241, 247, 353

[56] References Cited

U.S. PATENT DOCUMENTS

| 2,670,919 | 3/1954 | Esoldi | 52/28 X |
|---|---|---|---|
| 3,039,729 | 6/1962 | Nagle, Sr. | 248/343 |
| 3,104,087 | 9/1963 | Budnick et al. | 248/343 |
| 3,329,387 | 7/1967 | Fischer | 248/342 |
| 3,505,771 | 4/1970 | Thompson | 52/28 X |
| 3,597,889 | 8/1971 | Lo Nigro | 52/28 |
| 3,645,051 | 2/1972 | Kolesar | 52/28 |
| 3,755,667 | 8/1973 | Price | 52/28 X |
| 4,041,657 | 8/1977 | Schuplin | 52/28 X |
| 4,064,671 | 12/1977 | Sauer | 52/488 |

FOREIGN PATENT DOCUMENTS 278,849  11/1964  Netherlands ................ 52/665

Primary Examiner—Alfred C. Perham
Attorney, Agent, or Firm—Bard and Groves

[57] ABSTRACT

A light fixture support is provided comprising a support bar having slots at the extremities which cooperate with inverted "T" members forming the framework for a conventional suspended ceiling to adjustably locate and secure a light fixture within the framework. The slot configuration defined by the light fixture support permits the enlarged extremity of the upstanding portion of the "T" member to be rotated for insertion within the slot, returned to a vertical position, and retained within the slot. If desired, an adjustable support may be provided for accommodating a variety of "T" member spacings or for compact packaging with a light fixture.

12 Claims, 5 Drawing Figures

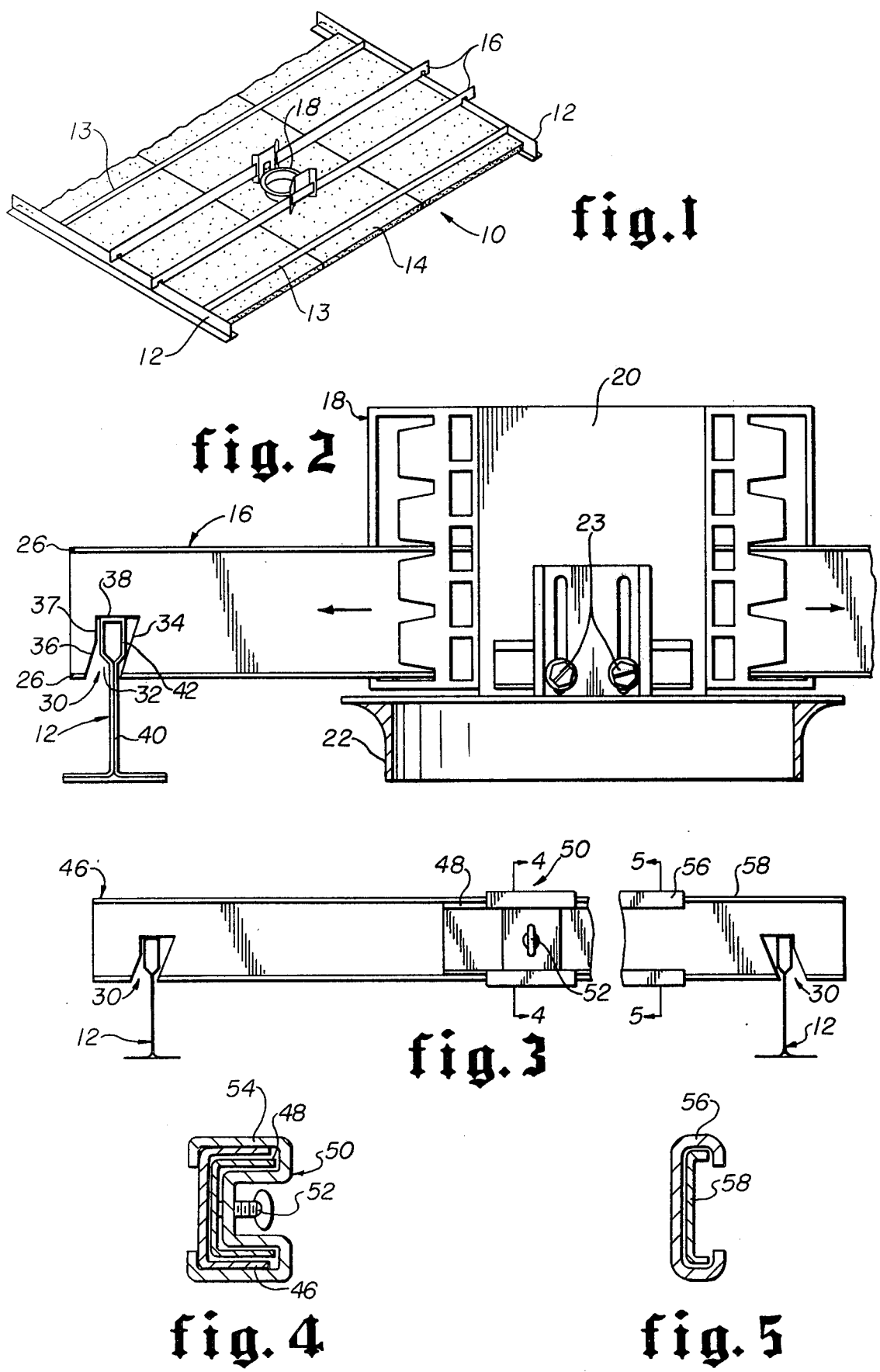

LIGHT FIXTURE SUPPORT

BACKGROUND OF THE INVENTION

This invention relates to construction members used in forming a suspended ceiling and, more particularly, to members for supporting and adjustably locating a light fixture within the suspended ceiling structure.

Suspended ceilings are in common use today in the construction of many commercial and residential complexes because of their attractive appearance and ease of installation. Typically, ceiling support members are suspended from the main frame members for the building. Various ceiling components such as ceiling tiles, light fixtures, and air conditioning outlets are thereafter interconnected with the support members. The ceiling support members generally take the form of an inverted "T" and are formed from sheet metal stock material. The resulting inverted "T" member has an enlarged portion at the extremity of the upstanding portion which not only increases the rigidity of the resulting "T" member but also improves the fabricability of the member from sheet metal stock. The inverted "T" support members are suspended from the main frame members generally by means of heavy wires or straps and the "T" members are the first components of the suspended ceiling which are installed.

Once the "T" member framework has been completed, the other elements of the suspended ceiling are then installed. Typical ceiling components which must be accommodated include air conditioning ducts and outlets and a variety of light fixtures. Each of these components must be supported by and secured to, the inverted "T" framework.

A large number of light fixtures must generally be provided at locations spaced around the area to be covered by the suspended ceiling. The location of these light fixtures is generally determined by esthetic considerations or the need to light particular areas where work is to be performed. As a result, light fixture installations must be capable of flexible installation to accommodate a variety of spacings within the supporting framework.

The prior art has provided support members for light fixtures which interact with the supporting framework in a variety of ways. U.S. Pat. No. 3,597,889 teaches a light fixture support member which extends between inverted "T" members and includes a generally inverted "U" portion at each extremity for fitting over the upstanding portion of the inverted "T". Set screws lock the fixture support member at a selected location along the inverted "T" members. In yet another prior art support member, a spring member clips over the upper extremity of the inverted "T" member for securing the light fixture support member to the "T". These prior art attempts either require a multiplicity of components to complete the support fixture or require relatively complex manufacturing operations to construct clip-type attachments.

It is common knowledge that the cost of commercial and residential construction is increasing at a rapid rate due to cost increases both in materials and in labor. It is, therefore, highly desirable that any manufactured component be designed to reduce its fabrication costs and enhance the efficacy with which the item performs its intended task. Accordingly, it is an important feature of the subject invention to provide a light fixture support member which can be installed and located on an inverted "T" support framework with minimum effort.

It is another feature of the present invention that only a single piece of stock material is needed to form a completed support fixture.

It is yet another feature of the present invention that the support member can be secured to the inverted "T" member without manipulating any locking devices.

It is still another feature of the present invention that a light fixture support member can be provided which is adjustable in length to accommodate a variety of "T" member spacings and/or to package compactly as a component part of a light fixture assembly.

SUMMARY OF THE INVENTION

The present invention is directed to providing a light fixture support member which can be installed on an inverted "T" member in a suspended ceiling construction by slightly rotating the "T" member during installation and thereafter returning the "T" member to an upright position for securing the light fixture support member to the inverted "T" member. In one embodiment, a U-shaped channel member is provided which is slotted at each end, and each slot is formed to allow the upper extremity of the "T" member to be inserted within the slot. The entrance to the slots is angled in the channel member with respect to the vertical. A vertical shoulder along one slot edge then permits rotation of the "T" member to a generally vertical position for locking the "T" member within the slot. During installation, one slot may be inserted over the upstanding end of a "T" member. The channel member is then rotated to a generally horizontal position which locks the "T" member within the slot. The other slot in the channel member is inserted over an adjacent "T" member by slightly rotating the upper extremity of the "T" member, inserting the upper extremity into the slot, and allowing the "T" member to rotate to a vertical position for locking within the second slot.

In yet other embodiments, a length adjustable light fixture support member is provided by a plurality of channel members in a sliding relationship whereby one channel member is retained within an outside channel member. If desired, a clamping means may be provided to firmly secure against relative movement of the channel members once a predetermined length has been set for the light fixture support member.

BRIEF DESCRIPTION OF THE DRAWINGS

In order that the manner in which the above-recited features of the invention are obtained, as well as others, which will become apparent, can be understood in detail, more particular description of the invention, briefly summarized above, may be had by reference to the specific embodiments thereof that are illustrated in the appended drawings, which drawings form a part of the specification. It is to be understood, however, that the appended drawings illustrate only typical embodiments of the invention and therefore are not to be considered limiting of its scope, for the invention may admit to other equally effective embodiments.

IN THE DRAWINGS

FIG. 1 is an isometric pictorial view of a portion of an installed suspended ceiling.

FIG. 2 is an elevation view showing a light fixture installed on the support channel and affixed to a "T" member.

FIG. 3 is an elevation of a length adjustable light fixture support member locked between adjacent "T" members.

FIG. 4 is a vertical cross-sectional view taken along lines 4—4 of FIG. 3.

FIG. 5 is a vertical cross-sectional view taken along lines 5—5 of FIG. 3.

DETAILED DESCRIPTION OF PREFERRED EMBODIMENTS

Referring now to the figures, and first to FIG. 1, there may be seen an isometric view of a typical suspended ceiling structure. Inverted "T" members 12 are the main structural components and are wired or otherwise connected to structural frame members (not shown). Ceiling tile supports 13 are connected to the inverted "T" members 12 and spaced apart a distance sufficient to accommodate installation of ceiling tile 14. Light fixture 18 is placed at a selected location within the suspended ceiling by means of light fixture support members 16 which are supported on "T" members 12 above ceiling tiles 14. Light fixture 18, which is commercially available, can move longitudinally along light fixture support channel 16. At a location where a light fixture 18 is desired, a suitable cut-out is made in ceiling tile 14, and the light fixture 18 is inserted therethrough.

Referring now to FIG. 2, there is seen an elevation view of light fixture support member 16 installed on inverted "T" member 12 with a light fixture 18 located thereon. Light fixture 18 typically includes a housing 20 for enclosing the light producing element (not shown), electrical connection means, and a light shade 22 which can be vertically adjusted by means of screws 23 to accommodate a variety of sizes of "T" members 12 and ceiling tiles (not shown). Light fixture 18 can move laterally along light fixture support channel 16 to a preselected location by means of spring fingers 24 which slidingly engage the inner surface of channel member 16 and hold the light fixture in a vertical relation thereto.

Light fixture support member 16 may conveniently take the form of a U-shaped channel member shape having top and bottom flanges 26 in accordance with one embodiment of the present invention. Support member 16 carries a novel slot 30 configuration at each end which retains support member 16 in place and which provides for ready installation of support member 16 onto inverted "T" member 12. The slot 30 configuration allows the enlarged portion of "T" member 12 to be inserted either when rotated slightly with respect to the vertical, and thereafter rotated to a vertical position for retention within slot 30 or when member 16 is rotated to orient slot 30 to a vertical position and moved downwardly to engage the upstanding portion 42 of "T" member 12. Member 16 can then be rotated to a horizontal position, locking portion 42 of "T" member 12 in the slot 30. To accomplish this, a first slot edge portion 34 is provided which forms an oblique angle with the plane of the flanges 26. A second angular slot edge 36 is formed parallel to side 34 and spaced apart therefrom for a distance sufficient to accommodate the enlarged portion 42 of the upstanding member 40 of inverted "T" member 12. A vertical slot shoulder portion 37 is also defined which intersects angular slot edge 36 as hereinbelow described.

Referring again to FIG. 2, it may be seen that the enlarged vertical portion 42 of inverted "T" member 12 is constrained within slot 30 after it has been rotated to a vertical position within slot 30. To accomplish this, the length of edge 34 is longer than the length of enlarged portion 42 to allow the enlarged portion 42 to be completely inserted within slot 30 when "T" member 12 is parallel to edge 34; when inverted "T" member 12 is oriented in the vertical position and member 16 is horizontal, the enlarged portion 42 will be retained within slot 30. Vertical shoulder 37 is provided to engage the flat side of enlarged portion 42. It may be readily seen from FIG. 2 that, if vertical shoulder 37 is projected to intersect bottom flange 26, the distance between such intersection and the intersection of edge 34 with flange 26 is smaller than the thickness of enlarged member 42 of "T" 12. Thus support channel 16 is captured and locked on inverted "T" 12 by the locking engagement resulting from the geometry of slot 30. Support channel 16 may be readily moved along inverted "T" member 12 to a predetermined location, or may be removed from inverted "T" member 12 by simply rotating inverted "T" member 12 and withdrawing light fixture support channel 16 from over the enlarged portion 42 of inverted "T" member 12 or rotating channel member 16 to a position allowing slot 30 to slide vertically over enlarged portion 42 of "T" member 16.

Referring now to FIG. 3 there may be seen an elevation view of an adjustable light fixture support channel configuration. In accordance with one embodiment of the present invention, a first channel member 46 is provided wherein a second channel member 48 can move longitudinally within the flanges of channel member 46. After channel members 46 and 48 have been installed on inverted "T" members 12, as above described, the separation of slots 30 is adjusted by tightening means 52 on clamp 50 to force together channel members 46 and 48 by means of clamp 50 to maintain the selected length.

In FIG. 4 there may be seen a vertical cross-sectional view of the light support fixture taken along lines 4—4 of FIG. 3, and showing clamp 50 having a body member 54 with a cross-sectional configuration for sliding engagement of channels 46 and 48 and having locking means 52, which may conveniently take the form of a screw or wing nut. Body member 54 is formed so that locking means 52 can securely clamp channel member 48 against channel member 46 and against body member 54. As depicted, a frictional clamp is provided to preclude relative movement between channel members 46 and 48.

The adjustable channel members of the light fixture support bar may also be formed as shown in FIG. 5, a vertical cross-sectional view taken along lines 5—5 of FIG. 3. Channel members 56 and 58 are shown with U-shaped flanges wherein support member 58 is retained within, and extensible from, support channel 56. The light fixture support channels may be formed in the configuration shown in FIGS. 4 and 5 to be packaged and shipped in a retracted position along with a light fixture and then extended for installation within a ceiling structure.

It is therefore apparent that the present invention is one well adapted to attain all of the features hereinabove set forth, together with other advantages which will become apparent and inherent from the above decription of the apparatus. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth and shown in the accompanying drawings are to be interpreted as illustrative of the invention and are not to be interpreted as limitations of the invention.

What is claimed is:

1. A light fixture support for a suspended ceiling, having inverted "T" ceiling members with upstanding portions having an enlarged extremity comprising
   at least one support having an integral locking section carrying a slot having an angled entrance portion for angularly receiving the upstanding enlarged portion of said "T" member and a vertical shoulder portion for engaging one side of said "T" member while a first edge of said angled entrance portion of said slot engages the other side of the upstanding enlarged portion of said "T" member for retaining said "T" member within said slot,
   said angled entrance portion being further defined by said first edge intersecting an edge of said light fixture support member at an oblique angle and a second edge parallel to said first edge and spaced apart therefrom to admit said enlarged portion of said "T" member and intersecting said verticle shoulder portion, and
   means for engaging a light fixture.

2. The light fixture support described in claim 1, wherein said support member has a substantially U-shaped channel cross-section.

3. The light fixture support described in claim 2, further including means for adjusting the length of said channel member for accommodating a variety of "T" member spacings.

4. The light fixture support described in claim 3, wherein said adjusting means includes
   a first light fixture support channel member, and
   a second light fixture support channel member sized to cooperate with and move within said first light fixture support.

5. The light fixture support described in claim 4, wherein said first light fixture support channel member has at least one substantially "U" shaped edge to retain said second channel member within said first channel member and permitting axial movement therebetween.

6. The light fixture support described in claim 4, further including means for clamping said first and second light fixture support channel members together to maintain a preselected length.

7. A light fixture assembly for installation in a suspended ceiling having inverted "T" members with an enlarged upstanding portion comprising:
   a fixture for enclosing a light source,
   at least one support having an integral locking section carrying a slot having an angled entrance portion for angularly receiving the upstanding enlarged portion of said "T" member and a vertical shoulder portion for engaging one side of said "T" member while a first edge of said angled entrance portion of said slot engages the other side of the upstanding enlarged portion of said "T" member for retaining said "T" member within said slot,
   said angled entrance portion being further defined by said first edge intersecting an edge of said light fixture support member at an oblique angle and a second edge parallel to said first edge and spaced apart therefrom to admit said enlarged portion of said "T" member and intersecting said verticle shoulder portion, and
   means for engaging a light fixture.

8. The light fixture assembly described in claim 7, wherein said support member has a substantially U-shaped channel cross-section.

9. The light fixture assembly described in claim 8, further including means for adjusting the length of said channel member for accommodating a variety of "T" member spacings.

10. The light fixture assembly described in claim 9, wherein said adjusting means includes
    a first light fixture support channel member, and
    a second light fixture support channel member sized to cooperate with and move within said first light fixture support.

11. The light fixture assembly described in claim 10, wherein said first light fixture support channel member has at least one substantially "U" shaped edge to retain said second channel member within said first channel member and permitting axial movement therebetween.

12. The light fixture assembly described in claim 10, further including means for clamping said first and second light fixture support channel members together to maintain a preselected length.

* * * * *